US012631510B2

(12) United States Patent　　(10) Patent No.:　US 12,631,510 B2
Carpenter et al.　　　　　　　(45) Date of Patent:　　May 19, 2026

(54) PRESSURE SENSOR MANIFOLDS FOR HIGH TEMPERATURES

(71) Applicant: Hamilton Sundstrand Corporation, Charlotte, NC (US)

(72) Inventors: Richard J. Carpenter, Amston, CT (US); James J. Kamm, South Windsor, CT (US); Patrick Louis Clavette, Burlington, CT (US); Shalman Ahmed, Vernon, CT (US); Myles R. Kelly, Willimantic, CT (US); Debabrata Pal, Hoffman Estates, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 301 days.

(21) Appl. No.: 18/238,811

(22) Filed: Aug. 28, 2023

(65) Prior Publication Data

US 2025/0076142 A1　　Mar. 6, 2025

(51) Int. Cl.
G01L 19/00　　(2006.01)
F01D 17/08　　(2006.01)

(52) U.S. Cl.
CPC .......... G01L 19/0007 (2013.01); F01D 17/08 (2013.01); G01L 19/0084 (2013.01); F05D 2220/32 (2013.01); F05D 2240/10 (2013.01); F05D 2260/80 (2013.01)

(58) Field of Classification Search
None
See application file for complete search history.

(56) References Cited

U.S. PATENT DOCUMENTS

| | | | | |
|---|---|---|---|---|
| 4,151,710 | A | 5/1979 | Griffin et al. | |
| 4,759,401 | A | 7/1988 | Pfouts et al. | |
| 5,090,740 | A | 2/1992 | Creager et al. | |
| 6,189,313 | B1 | 2/2001 | Cass et al. | |
| 6,508,129 | B1 * | 1/2003 | Sittler ................... | G01L 9/0075 |
| | | | | 73/756 |
| 7,836,680 | B2 | 11/2010 | Schwarz et al. | |
| 8,262,344 | B2 | 9/2012 | Alexander et al. | |
| 8,733,078 | B2 * | 5/2014 | Alholm ................. | F02D 35/023 |
| | | | | 60/39.821 |
| 8,806,926 | B2 * | 8/2014 | Boisseleau ................ | G01F 1/46 |
| | | | | 73/114.31 |
| 10,247,102 | B2 * | 4/2019 | Dreher ...................... | F23K 5/04 |
| 10,544,717 | B2 | 1/2020 | Waddleton et al. | |
| 11,549,446 | B1 * | 1/2023 | Drolet ................... | F01D 17/105 |
| 11,649,056 | B2 * | 5/2023 | Anderson .............. | G01K 13/02 |
| | | | | 244/134 B |
| 2020/0355568 | A1 * | 11/2020 | Golden ................. | G01L 19/147 |
| 2022/0235715 | A1 * | 7/2022 | Rambo ..................... | F02C 9/26 |

FOREIGN PATENT DOCUMENTS

EP　　　　3055534 B1　　1/2020

OTHER PUBLICATIONS

Extended European Search Report for EP Application No. 24196817.1, dated Jan. 23, 2025, 11 pages.

* cited by examiner

*Primary Examiner* — Eric S. McCall
*Assistant Examiner* — Nigel H Plumb
(74) *Attorney, Agent, or Firm* — Kinney & Lange, P.A.

(57) ABSTRACT

A pressure sensing system includes a housing that houses one or more pressure transducers therein. A tube is sealed to the housing at a first end of the tube. One or more pressure transducers are in fluid communication with a second end of the tube through an inner passage of the tube for sensing pressure at the second end of the tube.

20 Claims, 3 Drawing Sheets

PRESSURE SENSOR MANIFOLDS FOR HIGH TEMPERATURES

BACKGROUND

1. Field

The present disclosure relates to sensor systems, and more particularly to pressure sensors such as used in gas turbine engine control.

2. Description of Related Art

Normally pressure sensors that monitor compressor discharge/burner pressures (P3) in gas turbine engines are located remotely with a deadheaded line such that the temperatures are low enough to allow the sensor to be highly accurate and reasonably robust. In the typical embodiment, a removable plumbing line using an AN (Army/Navy standard) style fitting interface at the sensor is used. This interface can result in leakage which has been shown to cause failure of the sensor to due to high temp exposure from convective heating.

The conventional techniques have been considered satisfactory for their intended purpose. However, there is an ever present need for improved systems and methods for high temperature pressure sensing. This disclosure provides a solution for this need.

SUMMARY

A pressure sensing system includes a housing that houses one or more pressure transducers therein. A tube is sealed to the housing at a first end of the tube. One or more pressure transducers are in fluid communication with a second end of the tube through an inner passage of the tube for sensing pressure at the second end of the tube.

The housing can include a manifold flange with one or more pressure transducers in fluid communication with respective ports in the manifold flange. The tube can be integral with the manifold flange. The tube can be welded to the manifold flange at a weld joint that fully seals the respective ports and the inner passage of the tube in fluid communication with one another. The tube and the manifold flange can be metallurgically monolithic. The tube and the manifold flange can be additively manufactured as one piece. The tube and the manifold flange can be machined as a single piece. The respective ports in the manifold flange can each be in fluid communication with the inner passage of the tube.

A case flange configured to be mounted to a compressor case can be in fluid communication with an interior flow path of the compressor case. The case flange can be connected in fluid communication with the second end of the tube for fluid communication of pressure from the interior flow path of the compressor case, through the case flange, through the inner passage of the tube, and through the ports in the manifold flange, for pressure sensing pressure in the compressor case by the one or more pressure transducers. The housing can include an enclosure case mounted to the manifold flange to enclose the one or more pressure transducers.

The tube can define a labyrinthine path through a heat exchanger. The heat exchanger can include fins radiating outward therefrom for heat exchange with nacelle air external from the tube and heat exchanger. The housing can include a harness for electrical communication of signals from the one or more pressure transducers to engine control components through the housing.

A gas turbine engine system includes an engine case. A housing houses one or more pressure transducers therein. The housing includes a manifold flange with the one or more pressure transducers in fluid communication with respective ports in the manifold flange. A tube is sealed to the manifold flange at a first end of the tube. The respective ports in the manifold flange are each in fluid communication with an inner passage of the tube. The one or more pressure transducers are in fluid communication with a second end of the tube through the inner passage of the tube for sensing pressure at the second end of the tube. A case flange is mounted to the engine case in fluid communication with an interior flow path of the engine case. The case flange is connected in fluid communication with the second end of the tube for fluid communication of pressure from the interior flow path of the engine case, through the case flange, through the inner passage of the tube, and through the ports in the manifold flange, for pressure sensing pressure in the engine case by the one or more pressure transducers.

The housing can include an enclosure case mounted to the manifold flange to enclose the one or more pressure transducers. The tube can define a labyrinthine path through a heat exchanger. The heat exchanger can include fins radiating outward therefrom for heat exchange with nacelle air in a nacelle outboard of the engine case. The engine case can be a compressor case of a compressor section upstream of a combustor that is upstream of a turbine section.

The housing can include a harness for electrical communication of signals from the one or more pressure transducers to engine control components through the housing. The case flange can be connected in fluid communication with the engine case through an fitting joint.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
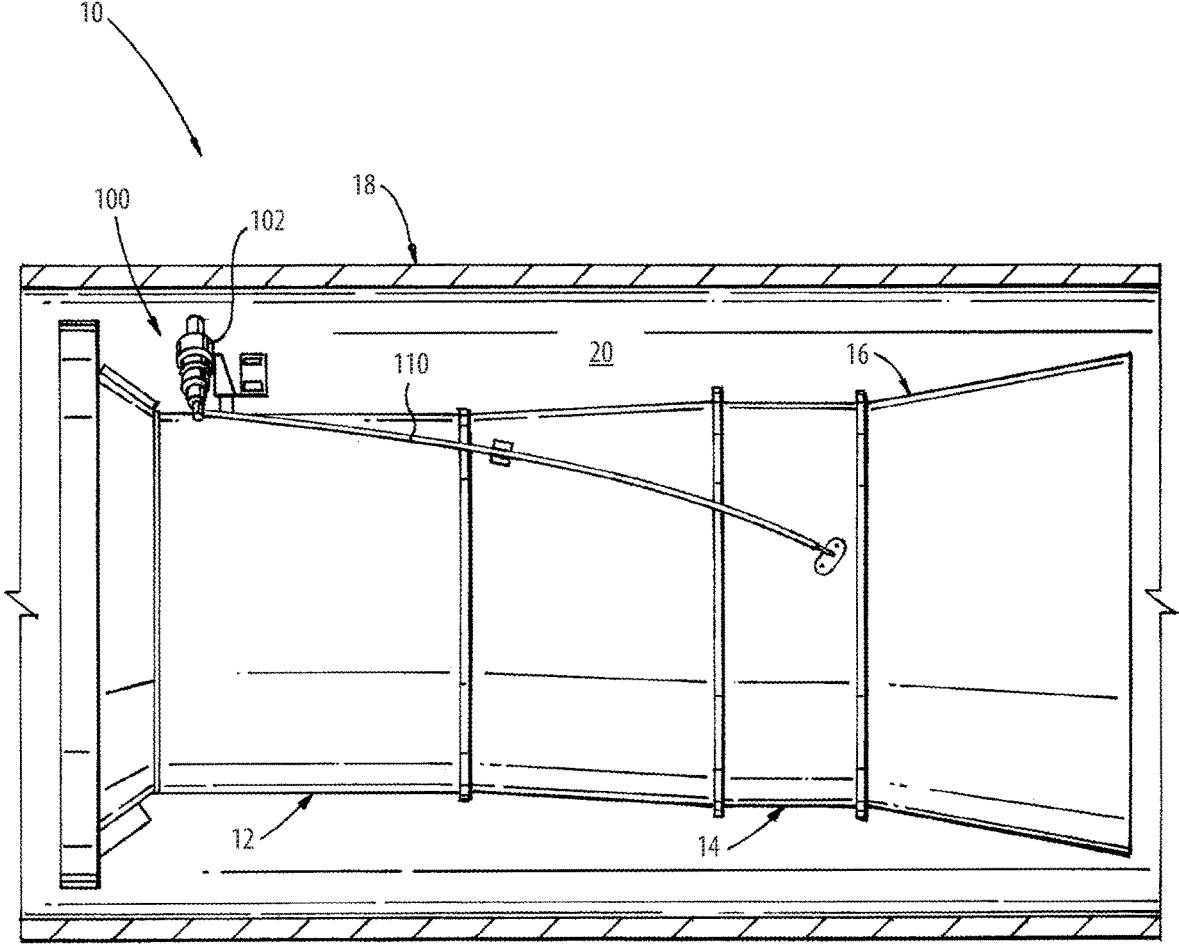
FIG. 1 is a schematic side elevation view of an embodiment of a system constructed in accordance with the present disclosure, showing the pressure sensor system mounted to the engine case.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-4, as will be described. The systems and methods described herein can be used to provide pressure sensors that avoid high temperature flow reaching sensitive component, counteracting potential installation errors or variations.

A gas turbine engine system 10 includes a compressor section 12 that supplies pressurized air to a combustor 14 downstream thereof. The combustor adds heat and combustion products to the pressurized air to drive a downstream turbine section 16. The turbine section 16 mechanically drives the compressor section 12. A nacelle 18 houses the compressor section 12, the combustor 14, and the turbine section 16. A first gas path is defined through the compressor section 12, the combustor 14, and the turbine section 16. A second, separate gas path 20 is defined through the nacelle 18 outboard of the compressor section 12, combustor 14, and turbine section 16. The engine system 10 includes a pressure sensing system 100.

Figure 2:
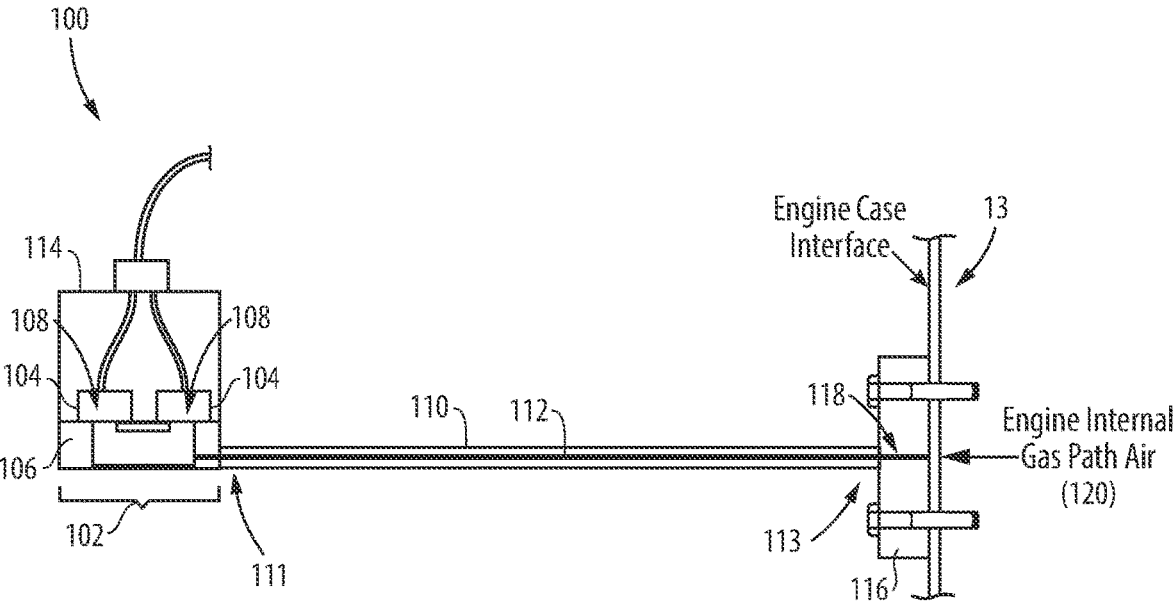
FIG. 2 is a schematic view of the pressure sensor system of FIG. 1, showing the tube connecting the manifold flange in fluid communication with the case flange.

With reference now to FIG. 2, the pressure sensing system 100 includes a housing 102 that houses one or more pressure transducers 104 therein. The housing 102 includes a manifold flange 106 with the one or more pressure transducers 104 in fluid communication with respective ports 108 in the manifold flange 106. A tube 110 is integral with the manifold flange 106 at a first end 111 of the tube 110. The respective ports 108 in the manifold flange 106 are each in fluid communication with an inner passage 112 of the tube 110. The one or more pressure transducers 104 are in fluid communication with a second end 113 of the tube 110 through the inner passage 112 for sensing pressure at the second end 113 of the tube 110. The housing 102 includes an enclosure case 114 mounted, e.g., welded, to the manifold flange 106 to enclose the one or more pressure transducers 104.

A case flange 116 is mounted, e.g. bolted, to the engine case 13, i.e. the compressor case of the compressor section 12 in FIG. 1. The case flange 116 includes an inner passage 118 therethrough in fluid communication with an interior flow path 120 of the engine case 13. The case flange 116 is connected with its inner passage 118 in fluid communication with inner passage 112 at the second end 113 of the tube 110. This provides fluid communication of pressure from the interior flow path 120 of the engine case 13, through the case flange 116, through the inner passage 112 of the tube 110, and through the ports 108 in the manifold flange 106, for pressure sensing pressure in the engine case 13 by the one or more pressure transducers 104.

The tube is sealed, e.g. with a polymeric seal, or by being integral as described below, with the manifold flange 106, so there is no AN (Army/Navy standard) flair fitting joint connecting the tube 110 to the housing 102. Instead of a polymeric seal sealing between the tube 110 and the manifold flange 106, the tube 110 can be welded to the manifold flange 106 at a weld joint that fully seals the respective ports 108 and the inner passage 112 of the tube 110 in fluid communication with one another. It is also contemplated that the tube 110 and the manifold flange 106 can be metallurgically monolithic, i.e. with no weld or heat effected zone connecting the two, e.g. wherein the tube 110 and the manifold flange 106 are additively manufactured or machined as one piece. The housing 102 includes a harness 122 electrically connected to the one or more pressure transducers 104 for electrical communication of signals from the one or more pressure transducers 104 to engine control components through the housing 102.

Figure 3:
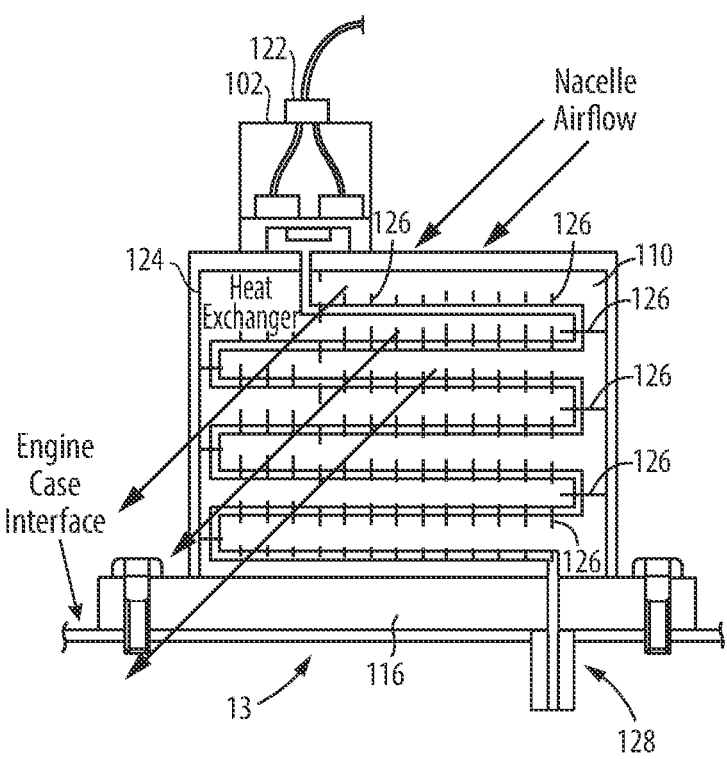
FIG. 3 is a schematic view of the pressure sensor system of FIG. 2, showing a tube as a labyrinthine part of a heat exchanger.
Figure 4:
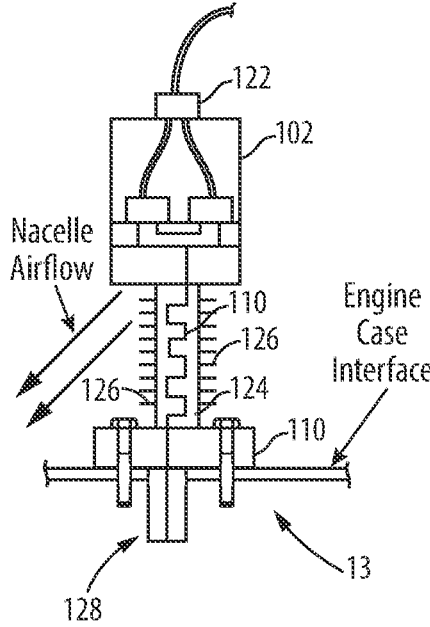
FIG. 4 is a lateral view of the system of FIG. 3, showing the second third dimension of the labyrinthine passage of the tube.

With reference now to FIG. 3, it is contemplated that the tube 110 can define a labyrinthine path through a heat exchanger 124. The labyrinthine structure can function to improve heat transfer and reduce or minimize the packaging. The heat exchanger 124 includes fins 126 radiating outward therefrom for heat exchange with nacelle air in the nacelle 18 (labeled in FIG. 1) outboard of the engine case 13, as indicated by the flow arrows in FIG. 3. The case flange 116 can be connected in fluid communication with the engine case 13 through a fitting joint 128, e.g. an AN (Army/Navy standard) flair fitting joint or the like. FIG. 4 shows the pressure sensor system of FIG. 3 from the lateral side to show that the labyrinthine path of the tube 110 can be labyrinthine in three dimensions.

Systems and methods as disclosed herein provide potential benefits including the following. They can prevent high temperature air leakage at the sensor and can improve mean time between failures (MTBF). They can simplify sensor installation and provide an improved packaging footprint. They can potentially be additively manufactured, and are simple, reliable, and robust. Heat exchanger fins cooled by nacelle air allows for lower temperature air from compressor reaching the sensor. This reduces temperature of the sensor.

The methods and systems of the present disclosure, as described above and shown in the drawings, provide for pressure sensors that avoid high temperature flow reaching sensitive component, counteracting potential installation errors or variations. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A pressure sensing system comprising:
    a housing that houses one or more pressure transducers therein;
    a tube sealed to the housing at a first end of the tube; and
    one or more pressure transducers in fluid communication with a second end of the tube through an inner passage of the tube for sensing pressure at the second end of the tube, wherein the tube defines a labyrinthine path through a heat exchanger.

2. The system as recited in claim 1, wherein the housing includes a manifold flange with one or more pressure transducers in fluid communication with respective ports in the manifold flange.

3. The system as recited in claim 2, wherein the tube is integral with the manifold flange.

4. The system as recited in claim 3, wherein the tube is welded to the manifold flange at a weld joint that fully seals the respective ports and the inner passage of the tube in fluid communication with one another.

5. The system as recited in claim 3, wherein the tube and the manifold flange are metallurgically monolithic.

6. The system as recited in claim 5, wherein the tube and the manifold flange are additively manufactured as one piece.

7. The system as recited in claim 5, wherein the tube and the manifold flange are machined as a single piece.

8. The system as recited in claim 3, wherein the respective ports in the manifold flange are each in fluid communication with the inner passage of the tube.

9. The system as recited in claim 8, further comprising a case flange configured to be mounted to a compressor case in fluid communication with an interior flow path of the compressor case, wherein the case flange is connected in fluid communication with the second end of the tube for fluid communication of pressure from the interior flow path of the compressor case, through the case flange, through the inner passage of the tube, and through the ports in the manifold flange, for pressure sensing pressure in the compressor case by the one or more pressure transducers.

10. The system as recited in claim 3, wherein the housing includes an enclosure case mounted to the manifold flange to enclose the one or more pressure transducers.

11. The system as recited in claim 1, wherein the heat exchanger includes fins radiating outward therefrom for heat exchange with nacelle air external from the tube and heat exchanger.

12. The system as recited in claim 1, wherein the housing includes a harness for electrical communication of signals from the one or more pressure transducers to engine control components through the housing.

13. The system as recited in claim 1, wherein the one or more pressure transducers comprises a plurality of pressure transducers and the housing includes a manifold flange comprising a plurality of ports, wherein each of the plurality of pressure transducers is in fluid communication with a respective one of the plurality of ports in the manifold flange, and wherein each the plurality of ports is in fluid communication with the inner passage of the tube.

14. A gas turbine engine system comprising:
an engine case;
a housing that houses one or more pressure transducers therein, wherein the housing includes a manifold flange with the one or more pressure transducers in fluid communication with respective ports in the manifold flange;
a tube sealed to the manifold flange at a first end of the tube, the tube defining a labyrinthine path through a heat exchanger, wherein the respective ports in the manifold flange are each in fluid communication with an inner passage of the tube, wherein the one or more pressure transducers are in fluid communication with a second end of the tube through the inner passage of the tube for sensing pressure at the second end of the tube; and
a case flange configured to be mounted to the engine case in fluid communication with an interior flow path of the engine case, wherein the case flange is connected in fluid communication with the second end of the tube for fluid communication of pressure from the interior flow path of the engine case, through the case flange, through the inner passage of the tube, and through the ports in the manifold flange, for pressure sensing pressure in the engine case by the one or more pressure transducers.

15. The system as recited in claim 14, wherein the housing includes an enclosure case mounted to the manifold flange to enclose the one or more pressure transducers.

16. The system as recited in claim 14, wherein the heat exchanger includes fins radiating outward therefrom for heat exchange with nacelle air in a nacelle outboard of the engine case.

17. The system as recited in claim 14, wherein the engine case is a compressor case of a compressor section upstream of a combustor that is upstream of a turbine section.

18. The system as recited in claim 14, wherein the housing includes a harness for electrical communication of signals from the one or more pressure transducers to engine control components through the housing.

19. The system as recited in claim 14, wherein the case flange is connected in fluid communication with the engine case through a fitting joint.

20. The system as recited in claim 14, wherein the one or more pressure transducers comprises a plurality of pressure transducers, each of the plurality of pressure transducers in fluid communication with one of the respective ports in the manifold flange, wherein each of the respective ports are in fluid communication with the inner passage of the tube.

* * * * *